Jan. 10, 1939. E. BIRK 2,143,236
TRANSMISSION GEARING
Filed March 19, 1938
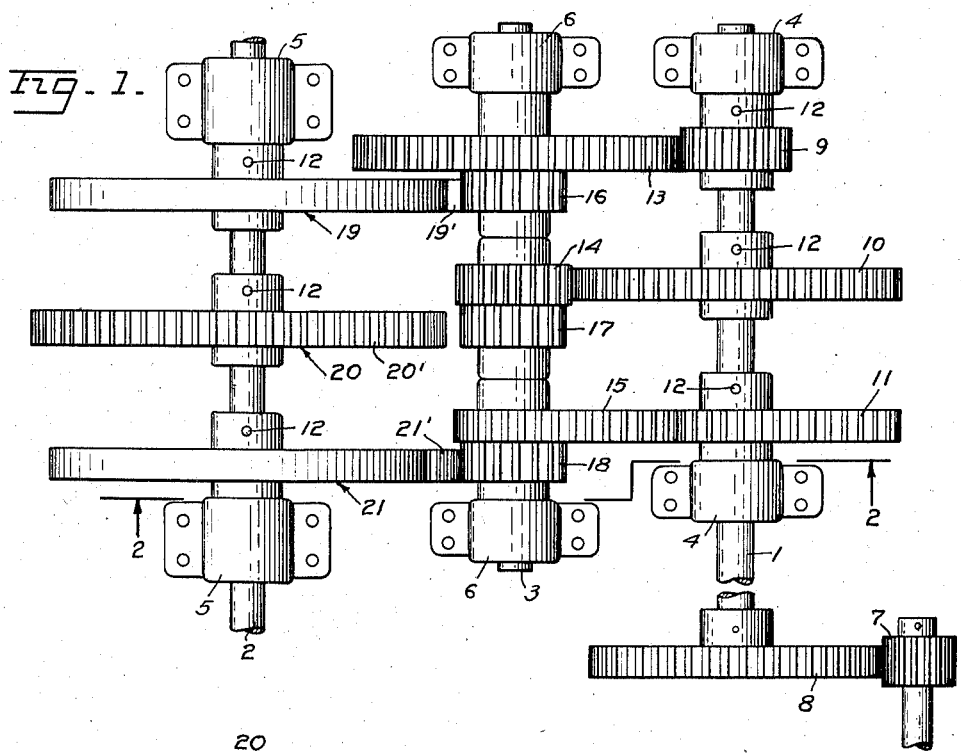
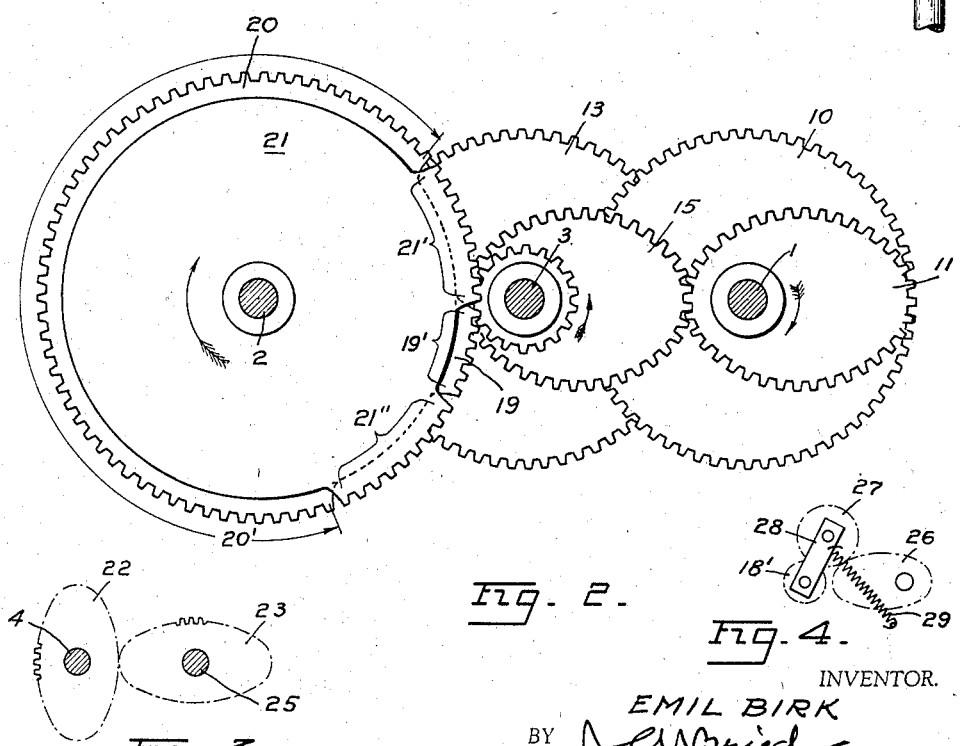
INVENTOR.
EMIL BIRK
BY
ATTORNEY.

Patented Jan. 10, 1939

2,143,236

UNITED STATES PATENT OFFICE 2,143,236

TRANSMISSION GEARING

Emil Birk, San Francisco, Calif.

Application March 19, 1938, Serial No. 196,932

8 Claims. (Cl. 74—435)

This invention relates to transmission gearing for industrial use as distinguished from automobile transmissions and the object of the invention is to provide a train of toothed gear wheels always in mesh, arranged and adapted to be driven by a suitable constant speed source of power and to yield a final work or output motion of predetermined varying speed.

A further object of the invention is to provide such a train of gears in which the gears are spur gears mounted on shafts and one of which shafts constitutes the driven or power receiving shaft and another shaft constitutes the power delivery or variable speed work shaft.

A further object of the invention is to provide a train of gears which with a constant speed driving force applied to one end will be so modified by passing therethrough as to revolve the work shaft in a manner to slowly pick up a load, gradually increase the speed to a predetermined maximum, and then run the load at such maximum speed for a predetermined time period; also such an arrangement which will thereafter decelerate the speed of the work shaft if desired to a predetermined minimum speed and run it for a predetermined time period at such minimum speed.

A still further object of the invention is to provide such a train of gears which will operate in the manner described in fixed bearings and without the aid of either friction or jaw clutches of any kind; also such an arrangement which will recycle continuously in the manner described so as to pick up a load slowly with the work shaft, gradually bring it up to speed, run it at such speed for the predetermined time period, then gradually decelerate to the lowest or pick up speed and run at this latter speed for a predetermined time interval to pick up another or the load again in repetition.

Other features and advantages of the invention will appear in the following description and accompanying drawing.

In the drawing

Figure 1 is a plan view of one embodiment of my transmission gear arrangement.

Figure 2 is a sectional elevation of Figure 1 as seen from the line 2—2 of Figure 1.

Figure 3 shows a modified arrangement of the elliptical gears of the train. Figure 4 shows a further modification.

Briefly described, the invention comprises a train of gear wheels included in which are one or more elliptical or eccentric gears arranged to accelerate and decelerate the speed of the work shaft in taking on, and slowing down, the load.

In the drawing 1 is the driven or power receiving shaft, 2 is the power delivery or work shaft, and 3 is an intermediate or countershaft, the shafts being respectively supported in rigid bearings 4, 5, and 6, though as the gears on the countershaft do not revolve with uniform speed some or all may be loose thereon, and in the latter case the bearings 6 act merely to align and support the shaft.

The driven or power receiving shaft 1 may be driven from any source of power such as a constant speed pinion 7 meshing with a gear 8 secured to the end of the shaft 1.

Mounted on shaft 1 is a spur pinion 9, a large spur gear 10, and an elliptical spur gear 11, each firmly secured thereto as by suitable keys or pins 12, and loosely mounted on the countershaft 3 and respectively meshing with gears 9, 10 and 11 are a large spur gear 13, spur pinion 14 and an elliptical spur gear 15, while respectively secured to one side of gears 13, 14 and 15 so as to revolve with them are spur pinions 16, 17 and 18.

All of the gears and pinions so far enumerated have teeth completely around their circumferences and to simplify the explanation of their action all teeth in the entire train of gears here shown are shown of the same size or pitch so that comparative portions of the respective diameters or circumferences may be designated by reference to a number of teeth, though it is to be understood that in various practical applications of my invention the pitches of the teeth may be varied to suit the particular requirements, as may also the ratios of the gears.

Work shaft 2 is provided with three large, round mutilated spur gears 19, 20 and 21, each secured to the shaft as by suitable keys or pins 12. These mutilated gears are of the same diameter and in alignment respectively with pinions 16, 17 and 18, and where the mutilated gears have teeth they engage with said pinions and clear them where their teeth are cut away.

For this particular example only pinions 9 and 14 each have twenty teeth, gears 10 and 13 each sixty teeth, pinions 16, 17 and 18 each eighteen teeth, mutilated gears 19, 20 and 21, if complete would have seventy-eight teeth, but are each cut away for a portion of their circumference as indicated in Figure 2, so as to leave a segment 19' of six teeth on gear 19, a segment 20' of fifty-four teeth on gear 20, and two spaced segments 21' and 21" on gear 21, these two segments of gear 21 being arranged to bring the six toothed segment of gear 19 directly between them as clearly indicated in Figure 2.

Elliptical gears 11 and 15 may be of any size and pitch which will continually remain in mesh when revolving about the axes of shafts 1 and 3, but are here shown as each having 36 teeth and being mounted eccentrically on their shafts with one of their foci coincident with the axis of the shaft, though by suitably modifying the various gear ratios they may be mounted centrally as shown in Figure 3.

In the arrangement shown each revolution of shaft 1 causes but one-third revolution of pinion 16, or displaces but six of its teeth, while pinion 17 is revolved three times or fifty-four teeth, whereas pinion 18 is revolved but once or eighteen teeth, or nine teeth during a half revolution of the elliptical gear 15 to which it is attached.

Since gears 15 and 11 are elliptical and mounted eccentrically on their foci in the manner shown in Figure 2, each revolution of these gears causes pinion 18 to vary in speed from a minimum (at the position shown in Figure 2) with gradual acceleration to a maximum when the gears have made a half turn, or advanced the position of the pinion nine teeth, and then gradually decelerate the speed of the pinion during the next half turn to the minimum again.

The arrangement or relation of the toothed segments 19', 20' and 21' and 21'' of mutilated gears 19, 20 and 21, is such as clearly shown in Figure 2, that pinion 18 at its lowest speed just engages the first (lowest in Figure 2) tooth of 9 tooth segment 21' of gear 21, and as the pinion makes a half turn in direction of the arrow with its elliptical gear, its speed increases to thereby similarly increase the rim speed of gear 21, and work shaft 2, until as the last tooth of segment 21 reaches pinion 18 the tooth speed is exactly the same as that of fast moving pinion 17 which then comes into engagement with the fifty-four tooth segment 20' of gear 20, and hence gear 20 and shaft 2 are revolved at this higher speed for three complete revolutions of eighteen tooth pinion 17, and during which time the elliptical gear 15 and its pinion 18 make a complete revolution but with pinion 18 out of gear as there are, during this period, no teeth on mutilated gear 21 for it to engage.

However, as the last tooth of the fifty-four tooth segment 20' of gear 20 reaches the pinion 17, the first tooth (lowest in Figure 2) of segment 21'' of gear 21 reaches pinion 18 and is engaged by it to carry the load without interruption or shock, as pinion 18 would then be traveling at identical rim or tooth speed, since the elliptical gears would then be in opposite position or each one-half turn from the position shown in Figure 2, and accordingly would at once begin to decelerate the speed of pinion 18, and the load carried by shaft 2, during the nine tooth engagement of pinion 18 with segment 21'' to the lowest speed (with elliptical gears in position shown in Figure 2) and at which point pinion 18 would pass out of mesh with segment 21'' and pinion 16 would be engaged with the six tooth segment 19' of gear 19 to carry the load for six teeth at the minimum speed, before again delivering the load through segment 21' to pinion 18 for accelerating as first described and shown in Figure 2 of the drawing.

In Figure 2 the elliptical gears are shown each pivoted through one of their foci, but may instead be pivoted through their centers as shown in Figure 3, and wherein the gears are represented as two plain ellipses 22 and 23 and their centrally disposed shafts or axes 24 and 25. In such case, however, the acceleration or deceleration would take place in a quarter turn rather than in a half turn of the gears arranged as in Figure 2, but this might suffice in some cases, especially as the ratios of the other gears particularly that between gears 19, 20 and 21 to their respective pinions, may be changed to suit any required condition of work.

With the use of two elliptical or eccentric gears I provide a train of gears to accomplish the intended purpose, yet maintain all shafts in fixed bearings, thus avoiding any swinging gears or movable bearings; however, it would be possible for some purposes to use but one eccentric gear as illustrated in Figure 4 at 26 arranged to drive a pinion 18' at a variable speed through an intermediary gear 27 pivoted on an arm 28 and held in contact with the elliptical gear as by a spring 29 or suitable cam arrangement. In this case pinion 18' would take the place of pinion 18 of Figure 2.

The principal application of my improved transmission gearing is for the purpose of starting a heavy load gently, such as a digging bucket on an endless chain, during contact of slow speed pinion 16 with the six tooth segment 19, then gradually accelerating the load along one of the segments 21' or 21'', carrying the load a predetermined time along high speed segment 20', then decelerating the load (as for dumping the bucket), then again running the bucket at slowest speed over six tooth segment 19' for taking on the next load.

A digging bucket load has been mentioned merely as an illustration as it is evident the transmission is applicable to any work more expeditiously carried out by predetermined variations in speed, and while the gearing arrangement provides for a sustained low speed of the work shaft, acceleration, sustained high speed, deceleration to low speed again, in repetition, it is manifest that the sustained high speed or sustained low speed or both may be varied to any degree with change of ratios, or eliminated to meet some conditions of work, and therefore while my complete arrangement as shown and described represents the invention in its complete form, the appended claims seek to cover any subordinate features to which I may be entitled to in view of what the prior art may show.

In regard to the mutilated gears 19, 20 and 21, while these are shown as separate gears, it is manifest that the various tooth segments may all be side by side on a single wheel if desired, and hence my claims are intended to cover any such consolidation of these gears.

Also as the variable speed gears may be elliptical or of any other peripheral form which will or may be made to continuously engage, and as they may in some cases be centrally mounted instead of eccentrically, my use of the phrase "eccentric gears" or gearing in the claims is to be taken as including any such variations which will perform in the manner intended.

While I have illustrated one application of the invention with spur gears with straight teeth, it is manifest that gears with spiral or herringbone teeth may be used, or any other type of gears which will carry out the invention as set out in the claims.

I therefore claim:

1. A train of transmission gearing including a pair of eccentric gears revolvably mounted on spaced axes constantly in mesh, a circular pinion revolvable on its central axis connected with one of said eccentric gears, and a circular mutilated gear revolvable on its central axis operated by said circular pinion.

2. A train of transmission gearing including a pair of eccentric gears constantly in mesh, a pinion connected with one of said eccentric gears, a mutilated gear operated by said pinion, a second pinion operated with the other eccentric gear, and a second mutilated gear in fixed relation to the first mentioned mutilated gear operated by said second pinion.

3. A train of transmission gearing including a pair of eccentric gears constantly in mesh, a pinion connected with one of said eccentric gears, a mutilated gear operated by said pinion, a plurality of pinions operated with the other eccentric gear, and a plurality of mutilated gears in fixed relation to the first mentioned mutilated gear operated by said pinions.

4. In a transmission gearing, a power shaft, a counter shaft and a work shaft, a plurality of different sized gears and an eccentric gear secured to the power shaft, a plurality of different sized gears on the countershaft in engaging relation to the gears of the power shaft, and an eccentric gear on the countershaft engaging the eccentric gear of the power shaft, and a plurality of mutilated gears on the work shaft with their tooth segments arranged for successive engagement by the gears of the countershaft.

5. In a transmission gearing, a work shaft provided with a plurality of circular mutilated gears secured concentrically thereto and with their toothed segments angularly arranged in staggered relation in a manner to form a complete circle of gear teeth, a plurality of adjacent circular gears rotatably mounted on their central axes arranged to successively engage said segments, and means for driving said adjacent gears.

6. In a transmission gearing, a work shaft provided with a plurality of circular mutilated gears secured concentrically thereto and with their toothed segments angularly arranged in staggered relation in a manner to form a complete circle of gear teeth, a plurality of adjacent circular gears rotatably mounted on their central axes arranged to successively engage said segments, and means for driving said adjacent gears at various rim speeds, and one of said adjacent gears at a predetermined variable speed.

7. In a transmission gearing, a work shaft provided with a plurality of circular mutilated gears secured concentrically thereto and with their toothed segments angularly arranged in staggered relation in a manner to form a complete circle of gear teeth, a plurality of adjacent circular gears rotatably mounted on their central axes arranged to successively engage said segments, and means for driving said adjacent gears at various rim speeds, and one of said adjacent gears at a predetermined variable speed to bring the rim speeds of the adjacent gears and respective segments of the mutilated gears to substantially identical rim speeds at times of meshing and unmeshing.

8. In a transmission gearing, a power shaft, a countershaft and a work shaft supported in rigid bearing in parallel spaced arrangement, a first pinion, first large gear, and first eccentric gear secured to said power shaft, a second large gear on said countershaft meshing said first pinion, a second pinion on said countershaft arranged to revolve with said second large gear, a third pinion on said countershaft meshing with said first large gear, a fourth pinion on said countershaft arranged to revolve with said third pinion, a second eccentric gear on said countershaft engaging said first eccentric gear, a fifth pinion arranged to revolve with said second eccentric gear, and three mutilated large gears secured to said work shaft arranged with their toothed segments in staggered relation to be successively engaged by said second, fourth and fifth pinions of the countershaft.

EMIL BIRK.